(No Model.)
S. SMITH.
INCASED STOP OR SHUT-OFF.
No. 415,685. Patented Nov. 19, 1889.
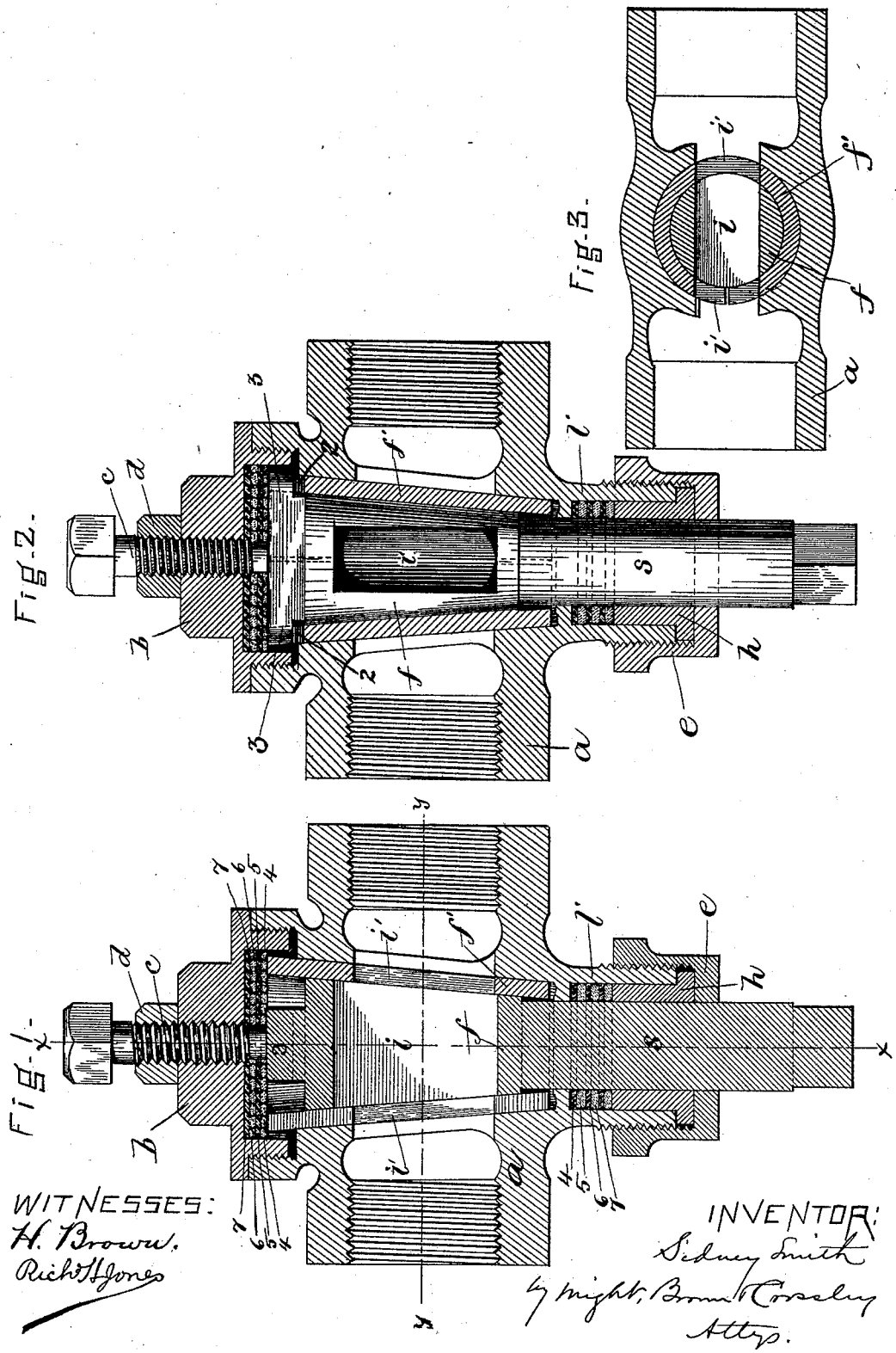
WITNESSES:
H. Brown.
Rich H. Jones
INVENTOR:
Sidney Smith
by Knight, Brown & Crossley
Attys.

UNITED STATES PATENT OFFICE.

SIDNEY SMITH, OF CAMBRIDGE, MASSACHUSETTS.

INCASED STOP OR SHUT-OFF.

SPECIFICATION forming part of Letters Patent No. 415,685, dated November 19, 1889.

Application filed April 30, 1887. Serial No. 236,664. (No model.)

*To all whom it may concern:*

Be it known that I, SIDNEY SMITH, of Cambridge, in the county of Middlesex and State of Massachusetts, have invented certain new and useful Improvements in Incased Stops or Shut-Offs, of which the following is a specification.

The object of my invention is to prevent in a stop or shut-off for liquids, steam, &c., the leakage between the movable inner portion or valve and its casing, caused by unequal expansion of said parts, and also to provide an improved packing for stops or shut-offs for the purposes above named; and to these ends my invention consists, first, in an incased stop or shut-off the casing and movable portion or valve of which are made of different metals or alloys, the one having its coefficient of expansion differing from that of the other.

It is well known that the casing of a shut-off being exposed to the atmosphere will not expand so much as the internal movable portion or valve of the shut-off when steam or a liquid having a higher temperature than the surrounding air is passing through the shut-off, said valve being in direct contact with the steam or liquid. It will be seen, therefore, that by forming the valve or movable portion of any suitable metal having its coefficient of expansion less than that of the metal of the casing a perfect joint can be maintained between the valve and casing when the temperature of the valve is increased to a greater extent than that of the casing, so that distortion of the casing and the wedging or binding of the valve within the casing, often caused by the heating of the valve, are prevented. So, also, if a substance colder than the surrounding air is passed through the shut-off the same result will be produced by making the valve of a metal more expansive than that of the casing. It is evident that the greater expansion of the metal of this interior portion or valve in the appliances in common use has a tendency to stretch the outside casing, cause a leak in the passage-way or joint, and render the usefulness of the shut-off short-lived. Whether dealing with hot or cold water, steam, gas, or any substance used by chemists—such as anhydrous ammonia or any liquid employed in cold storage—the importance of having such passages tight and free from liability to leakage is so great and so much the universal desire of all users of such mechanical devices as to render any extended explanation on this point unnecessary.

My invention is applicable to all appliances capable of permitting and of shutting off the flow of steam or liquids through pipes or conduits.

I have shown one convenient embodiment of my invention, which I will now describe, reference being had to the accompanying drawings, forming a part of this specification, in which—

Figure 1 represents a vertical section of a shut-off adapted to be attached to conducting-pipes. Fig. 2 represents a section on line $x\,x$, Fig. 1. Fig. 3 represents a section on line $y\,y$, Fig. 1.

The same letters of reference indicate the same parts in all the figures.

In the drawings, $a$ represents the body of the casing.

$f\,f'$ represent the valve or movable portion of the shut-off, the same being composed in this instance of the plug portion $f$, having the passage or way $i$, and the shell $f'$, fitting the exterior of the plug $f$, and having slots $i'\,i'$ coinciding with the passage $i$. The shell is provided at its upper end with recesses 2 2, which receive shoulders 3 3, formed on the upper end of the plug portion $f$, the two parts being thus interlocked.

The entire body of the casing $a$ is made of a suitable hard metal or alloy, the same differing in its expansibility from that of the valve, as already explained, the homogeneous nature of the casing being important, in that it gives the casing sufficient strength and durability to withstand the pressure of steam and other fluids under heavy pressure. The stem $s$ of the valve is surrounded by a gland $h$, held by a screw-cap $e$. The valve is held in place by a set-screw $c$, working in a cap $b$, which is screwed to the casing $a$, as shown in Fig. 1, said set-screw being locked by a jam-nut $d$. Within said cap $b$ is a circular chamber 1, surrounding the inner end of the set-screw $c$.

Before screwing the cap $b$ to the casing $a$, I place in the chamber 1 a layer 4 of paraffine, a layer 5 of asbestus cord saturated with paraffine placed against the paraffine, a layer 6 of the substance known as "rex," and another layer 7 of asbestus cord saturated with rex. The substance termed "rex" is an article of commerce manufactured by the Leader Lubricating Company, of Buffalo, New York. The composition of this substance is not known to me; but I find it very useful for the purpose for which I use it, because it is unaffected by steam and also by anhydrous ammonia, so that a valve provided, as described, with rex is useful either as a steam-valve or in pipes used to conduct refrigerating-chemicals in cold-storage warehouses. The aggregate thickness of the said layers is such that when the cap $b$ is screwed to place on the casing the layers are compressed and caused to expand laterally until they completely fill the chamber 1 and insure an absolutely-tight joint around the end of the valve and around the set-screw. The packing-space $l'$ surrounding the stem $s$ is provided with a similar packing composed of layers of paraffine, asbestus cord, and rex, all suitably compressed by the screw-cap $e$ and gland $h$. This improved packing is durable, easily applied, and adapted to resist the action of steam, hot liquids, and chemicals such as anhydrous ammonia.

I may use paraffine and asbestus cord, to the exclusion of rex, if preferred; or the packing may be composed only of asbestus cord and rex. Both the paraffine and rex are in a cold and semi-solid state when first applied.

I claim—

1. In a cock or shut-off, the combination of a homogeneous casing the entire body of which is composed of a metal or alloy having a given coefficient of expansion, and a metallic movable part or valve fitted to turn in said casing and having a coefficient of expansion which is less than that of the casing, as set forth.

2. In a cock or shut-off, the combination of a homogeneous casing the entire body of which is composed of a metal or alloy having a given coefficient of expansion, and a movable part or valve fitted to turn in said casing and composed of two parts—viz., a sleeve or external part $i'$ in contact with the casing and composed of a metal or alloy whose coefficient of expansion is less than that of the casing, and an inner portion or core $i$ within the sleeve $i'$ and composed of a metal or alloy whose coefficient of expansion is less than that of the sleeve $i'$, the said sleeve being loosely fitted on said core, as set forth.

In testimony whereof I have signed my name to this specification, in the presence of two subscribing witnesses, this 20th day of April, 1887.

SIDNEY SMITH.

Witnesses:
C. F. BROWN,
FRED. W. SMITH.